United States Patent Office

3,430,025
Patented Feb. 25, 1969

3,430,025
METHOD OF LOW FREQUENCY ELECTRIC IMPULSE METAL WORKING AND GENERATORS FOR PRODUCING IMPULSES NEEDED TO ACCOMPLISH THE SAME METHOD
Abram Lazarevich Livshits, Moscow, Ivan Sergeevich Rogachev, Kharkov, Alexandr Borisovich Sosenko, Moscow, and Vladimir Lvovich Benin, Kharkov, U.S.S.R., assignors to Experimentalny Nauchno-Issledovatelsky Institute Metallarezhushchikh Stankor
Filed Sept. 25, 1963, Ser. No. 311,382
U.S. Cl. 219—69                        2 Claims
Int. Cl. B23k 15/00; H02p 13/12; H01f 21/08

ABSTRACT OF THE DISCLOSURE

A method of working metals by arc pulses having energies of 50 to 1000 joules and durations of 5,000 to 20,000 microseconds, respectively, with the lower pulse energies for the shorter durations and vice versa. The duty ratio for this range of energies decreasing correspondingly from 5 to 1, while maintaining pulse frequency. Tool electrode wear is controlled by the superposition on the main pulses of alternating pulses of lower energy and shorter duration than the main pulses. A special generator for the system comprises a self-saturating one-way choke magnetic amplifier mounted on two cores with alternating current power windings and control windings energized by a D.C. source, and a full-wave rectifier in series with the power windings.

---

Figure 1:
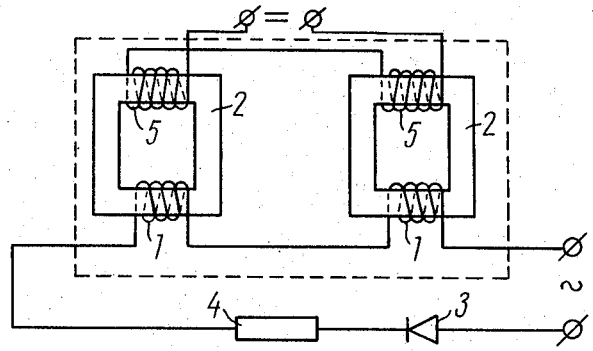

The present invention is related to electric erosion, particularly electric impulse, metal working.

More particularly, the invention refers to low frequency electric impulse metal working, effected by long arc impulses having a duty ratio within 1 to 5.0 at different frequencies.

Still more particularly, the invention is concerned with an optimal method to conduct said working and with static generators of said long arc impulses.

It is of common knowledge that the maximum take-off rate for steel in electric impulse working of shape surfaces, that is in profiling and broaching operations, amounts to 5,000 through 6,000 cubic millimeters per minute, and in working steel with 0.45% to 0.47% carbon content said rate ranges somewhat higher (for some refractory alloys said rate ranges from 9,000 to 10,000 cu. mm./min.).

Although persistent attempts have been made to raise take-off rate above said quantities, which might be achieved substantially by varying parameters of impulse discharges, they have not produced the result until now.

Investigations, conducted by the inventors and aimed at ensuring a possible increase in efficiency of electric impulse treatment, showed that it is impossible to materially raise the efficiency by current rise alone at a constant frequency. Thus, for a frequency of 400 impulses per second current of about 500 A. and a take-off rate of the order of 7,000 cu. mm. per min. are the limits for steel with content=0.45% to 0.47%. For higher frequencies this range narrows. It was found that under all other conditions being identical useful power employed in the operating area (otherwise called efficiency of the process) and available take-off rate increase with the reduction in frequency of impulse sequence and with the increase in their energy respectively, and that the maximum take-off rate is ensured by generators producing impulses which have a frequency of 50 to 300 cycles and an energy of several hundred joules per impulse.

Summary

Proposed is a method of working metals by homopolar arc pulses having energies of 50 to 1000 joules and durations of 5,000 to 20,000 microseconds, respectively, shorter pulse durations corresponding to less energies and vice versa, and a duty ratio in this range of energies decreasing correspondingly from 5 to the limit of 1 while maintaining the pulse frequency. To control the wear of the tool electrode, it is proposed to superpose on main pulses additional alternating pulses of the same or opposite polarity having less energy and shorter duration than the main ones.

To carry this method into effect, there are proposed generators composed, for example, of a self-saturating one-way choke magnetic amplifier mounted on two cores with alternating-current power windings and control windings supplied from a direct-current source, and a full-wave rectifier provided with uncontrollable valves connected in series with said power windings.

The principal object of our invention is to possibly ensure a considerable rise of the take-off rate in low frequency electric impulse metal working.

It is also an object of the invention to reduce energy consumption and to raise efficiency of the process of low frequency electric impulse working.

At the same time, it is an object of the invention to increase durability of electrode tools and to provide a possible realization, in some cases, of practically non-wear operation of tools in high-efficiency duties.

It is also among the objects of the invention to simplify and to increase reliability of electric static generators employed to generate impulses with the required frequency and energy to accomplish the proposed method.

In accordance with the invention we have overcome said limits for a take-off rate in low frequency electric impulse metal working by simultaneous sudden increase of energy of impulses and their duration, impulse energy amounting to several hundred joules while duration may equal tens of thousands of microseconds. Utilization of these parameters of impulses in sizing shape surfaces has been till lately considered as absolutely impossible, firstly, because of impossibility of the least precise profiling of electrode shape with impulses having the duration not greater than 2,000 to 3,000 microseconds, and, secondly, because of the loss of stability in the process with the increase of the impulse energy to hundreds of joules.

Simultaneous increase of the energy and impulse duration (which individually resulted in drop of the speed after a certain limit) enables to considerably raise take-off rates, thus, ensuring an unexpected effect, characterized by a possible take-off rate up to tens of thousands of cubic millimeters per minute and at the same time obtaining a stable process and high strength of the tool.

Improvement of efficiency is caused hereby not only by increase in the operating current of an impulse, but to a greater extent by drop of energy consumption of the process which fact denotes a considerable rise of the process efficiency, and by increase of a relative number of impulses conducting effective metal take-off.

Durability of the tool is low frequency electric impulse metal working rises thanks to rapid recovery of carbon from a working medium when impulses of an increased duration are utilized. Increased durability of electrode tools is so significant that with graphitized electrodes utilized, in particular, the electrode may not wear at all thanks to self-recovery.

The balance between electrode destruction and recovery may not only be maintained, but even intentionally violated for restoring—then, the electrode does not wear, it rather becomes larger.

The latter fact enables to conduct the working in a novel way. It is known, that the alternating current sizing of shape surfaces is practically impossible, first of all, because of a polar effect displayed in that one of the elecrodes (a tool acting as an anode in electric impulse treatment) destroys less than the other. Alternating polarity under regular conditions leads to rapid consumption of an electrode tool, and it is fighting this effect that necessitated rather complicated generators producing strictly unipolar impulses. The revealed effect—sudden decrease of consumption or even increase in size of graphitized electrodes with impulses of an increased duration utilized, enables, without noticeable increase of consumption of electrode tools, to conduct the treatment by alternating impulse current, produced, for instance, by a peak transformer with a sufficiently evident interval between voltage halfwaves. Also, in discharging at one polarity self-recovery may prevail to compensate the consumption at a subsequent discharge at the other polarity.

A possible sudden increase in efficiency and a subsequent usage of relatively large parts for efficient employment of electric impulse working, result in that low surface purity in working by impulses of great energies does not provide an obstacle for high-efficiency duties employed in electric impulse working. Furthermore, height of roughnesses on an erosed surface after a step reduction of duty at the end of the operation ranges from 0.2 to 0.5 mm. and is substantially uniform thereby considerably facilitating its further smoothing with regard to straight line milling commonly used for large shape hollows.

Till lately, mainly electric machines have been employed as generators of unipolar impulses.

Ion current converters are utilized in the known static installations for electric impulse metal working to serve as impulse generators having a frequency from 50 to 300 impulses per second and a duty ratio from 1.0 to 5. However, said converters are insufficiently reliable, they have a limited term of service and tend to back ignitions and other failures.

In accordance with the present invention, we hereinafter propose to employ magnetically saturated static generators for this purpose in various modifications, the design of which is based on the self-saturating magnetic amplifier. Such generators are capable of ensuring the power supply of set-ups for electric impulse metal working by impulses of a relatively low frequency (50 to 300 impulses per second) and practically unlimited power, which fact results in an increase in efficiency and a reduction of the tool electrode wear.

Due to the absence of ionic and electronic devices in said generators, they are simpler in design; moreover, they permit an increase in the dependability and durability of the entire setup as compared with the prior art static apparatus.

Figure 2:
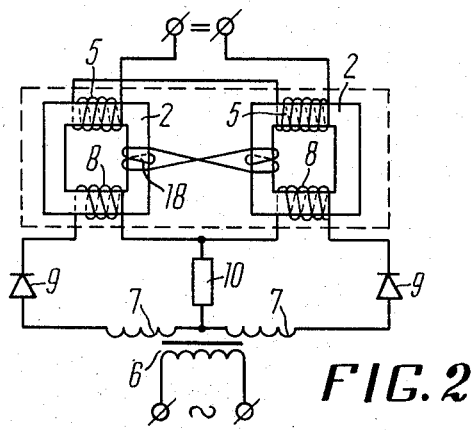
Figure 3:
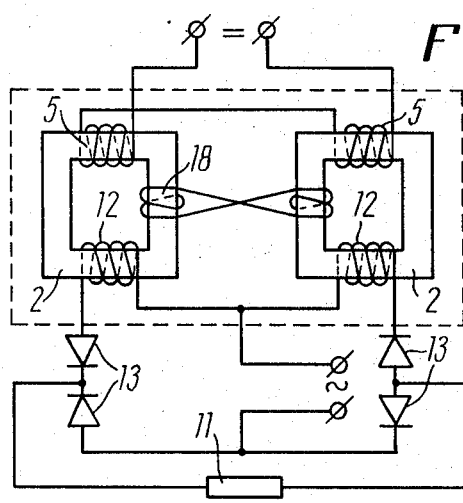
Figure 4:
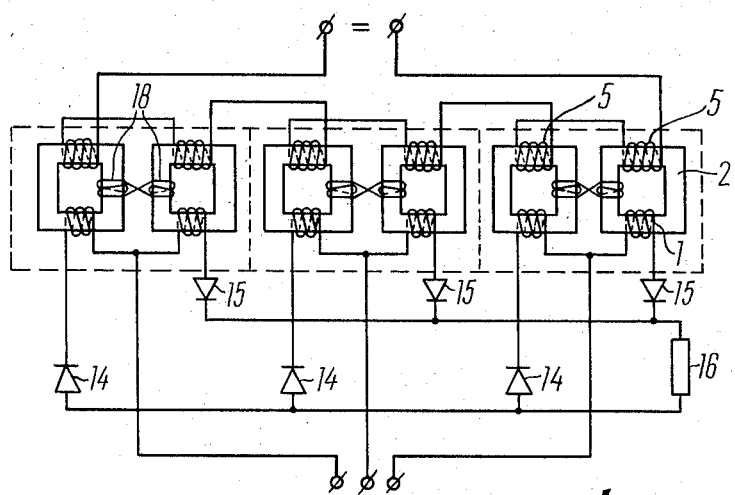
Figure 5:
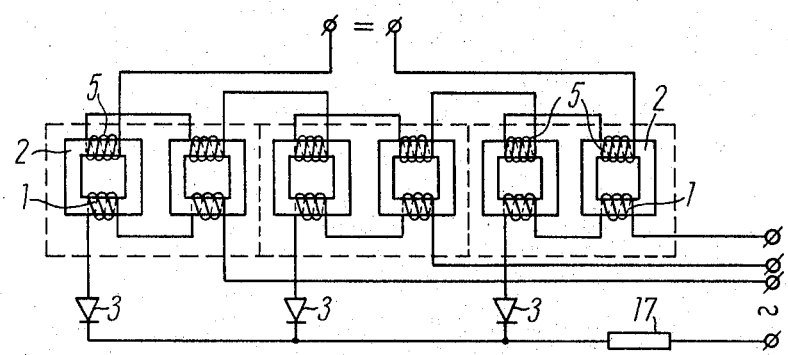

To make the idea of our invention more apparent in the part relating to generators for carrying into effect the proposed and heretofore disclosed method for electric impulse metal working, we hereinafter describe possible embodiments of impulse generators taken in conjunction with the accompanying drawings showing generators based on magnetic amplifiers, and in which:

FIG. 1 shows a generator based on a self-saturated magnetic amplifier with output frequency of 50 pulses per second;

FIGS. 2 and 3 show generators based on self-saturated magnetic amplifiers with output frequency $f=100$ pulses per second with middle-point rectification and bridge rectification, respectively; and FIGS. 4 and 5 show generators based on three self-saturated magnetic amplifiers with output frequencies of 300 and 150 pulses per second, respectively.

In FIG. 1, connected in series into the alternating-current circuit are primary windings 1 of a magnetic amplifier assembled with the use of two cores 2, semi-conductor valve 3 and load 4 composed of the erosion gap and, in some cases, ballast resistance (which is not shown on the diagram). Arranged on cores 2 are control windings 5 connected into the direct-current circuit. By varying the current magnitude in control windings 5 it is possible to generate in the load circuit pulses of different duty ratios, varying with the control current. Duty ratio is the ratio of time for a full pulse cycle (i.e., from the start of successive pulses) to the duration of a pulse. It is, therefore, never less than one. Simultaneously, the average current magnitude in the load circuit varies so that a decrease in the load current corresponds to an increase in the duty ratio of pulses, which is conducive to improving the finish of the surface being machined.

FIG. 2 shows a diagram of transformer 6, the secondary winding 7 of which features a mean point removed therefrom. Connected in series with the secondary winding 7 of transformer 6 are primary windings 8 of the magnetic amplifier and non-controlled valves 9 of the rectifier. Load 10 is connected between the mean points of secondary winding 7 of transformer 6 and primary windings 8 of the magnetic amplifier. According to this diagram, the primary windings 8 of the magnetic amplifier are alternately connected to the load, and the pulse frequency equals $2f$, where $f$ is the alternating current frequency in the power-supply network.

FIG. 3 shows a diagram in which, connected in series with load 11 and primary windings 12 of the magnetic amplifier, is a rectifier composed of four valves 13 assembled according to bridge connection. With this connection, in contradistinction to the generator according to the diagram of FIG. 1, the frequency of pulses and average current value are doubled, whereas the duty ratio decreases accordingly. A unipolar impulse generator according to the diagram of FIG. 4 is composed of three full-wave rectifiers connected in a three-phase system with a bridge-type rectifier comprising six uncontrolled valves 14 and 15 operating for common load 16. Impulse frequency of this generator equals $6f$.

The unipolar impulse generator according to the diagram shown in FIG. 5 is composed of three single-phase half-wave generators manufactured according to the diagram of FIG. 1 star-connected in a three-phase system and supplying common load 17. Impulse frequency in this circuit is $3f$, and the duty ratio is somewhat less than that in single-phase connections.

In all the full-wave generators (FIGS. 2, 3, and 4), additional short-circuit windings 18 are employed, intended to remove even harmonic components of the generator's output voltage.

In a general case, for practical use, we recommend generators based on magnetic amplifiers of a single-phase and a three-phase type with a half-wave rectifier, said generators enabling the using of maximum power impulses at the maximum duty ratio and minimum frequency, which corresponds to the maximum efficiency.

Full-wave circuits are recommended for usage if a higher surface finish is required.

Although this invention has been described in accordance with the preferred embodiments, it will be apparent that various changes and modifications may be introduced without departing from the spirit and scope of the invention, which will be readily understood by those skilled in the art. These changes and modifications are considered to be within the idea and the scope of the invention disclosed in the subjoined claims.

What we claim is:

1. A method of working metals by a tool electrode with homopolar arc main pulses having energies of 50 to 1000 joules and pulse durations respectively ranging from 5000 to 20,000 microseconds for this energy range with a duty ratio nearing 1, and by superposed pulses supplied from another generator and having shorter durations and less energies than those of the main pulses, whereby the main pulses produce metal removal and adherence of a carbon film to the surface of the tool electrode while the superposed pulses remove the excess of said carbon film, thus controlling the regeneration and wear of the tool electrode.

2. A method of working metals by homopolar arc main pulses having energies of 50 to 1000 joules and pulse durations of 5,000 to 20,000 microseconds respectively, wherein lower energy pulses have respectively shorter durations and higher energy pulses have respectively longer durations, with a duty ratio for this range of energies respectively decreasing from 5 to 1 while maintaining pulse frequency, and by superposed pulses supplied from a source independent of the arc main pulse source, said superposed pulses having shorter durations and being of the opposite polarity to the arc main pulses whereby the main pulses produce metal removal and adherence of a carbon film to the surface of the tool electrode while the superposed pulses remove excess of said carbon film thus regulating wear of the electrode.

References Cited

UNITED STATES PATENTS

| | | | |
|---|---|---|---|
| 1,813,409 | 7/1931 | Kouyoumjian | 323—89 |
| 2,835,784 | 5/1958 | Williams | 219—69 |
| 2,843,842 | 7/1958 | King | 323—51 X |
| 3,213,258 | 10/1965 | Ferguson | 219—69 |
| 3,225,291 | 12/1965 | Miura | 323—89 |
| 3,087,044 | 4/1963 | Inoue | 219—69 |
| 3,158,728 | 11/1964 | Webb | 219—69 |
| 3,283,116 | 11/1966 | Scarpelli | 219—69 |

OTHER REFERENCES

"Mechanical Engineering," Nat'l. Science Foundation, Washington, D.C., available from Office of Technical Service, U.S. Dept. of Commerce, Washington, D.C., OTS 80–51089 (1961), pp. 100, 106, 107, 116, 117, 101, 102–105, 108–115.

RICHARD M. WOOD, *Primary Examiner.*

R. F. STAUBLY, *Assistant Examiner.*

U.S. Cl. X.R.

323—89